United States Patent
Qiu et al.

(10) Patent No.: US 6,435,128 B2
(45) Date of Patent: *Aug. 20, 2002

(54) TIME-TEMPERATURE INTEGRATING INDICATOR DEVICE WITH BARRIER MATERIAL

(75) Inventors: Jean Qiu, Andover, MA (US); Joan M. Noyola, Maplewood, MN (US); David J. Yarusso, Shoreview, MN (US); Kevin R. Green, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/824,343

(22) Filed: Apr. 2, 2001

Related U.S. Application Data

(63) Continuation-in-part of application No. 09/069,576, filed on Apr. 29, 1998, now Pat. No. 6,244,208.

(51) Int. Cl.[7] ................................................ G01K 3/00
(52) U.S. Cl. .................. 116/207; 116/219; 374/162; 374/106
(58) Field of Search .................. 116/207, 216, 116/217, 218, 219; 374/100, 102, 106, 159, 160, 161, 162; 426/88

(56) References Cited

U.S. PATENT DOCUMENTS

| | | |
|---|---|---|
| 2,379,459 A | 7/1945 | Schrieber et al. |
| 3,243,303 A | 3/1966 | Johnson |
| 3,430,491 A | 3/1969 | Gignillist, III |
| 3,665,770 A | 5/1972 | Sagi et al. |
| 3,954,011 A | 5/1976 | Manske |
| 4,154,107 A | 5/1979 | Giezen et al. |
| 4,353,990 A | 10/1982 | Manske et al. |
| 4,410,493 A | 10/1983 | Joslyn |
| 4,428,321 A | 1/1984 | Arens |
| 5,120,137 A | 6/1992 | Ou-Yang |
| 5,667,303 A | 9/1997 | Arens et al. |
| 5,709,472 A | 1/1998 | Prusik et al. |
| 6,244,208 B1 * | 6/2001 | Qiu et al. ............ 116/207 |

FOREIGN PATENT DOCUMENTS

WO     WO 89/04952     6/1989

* cited by examiner

Primary Examiner—Diego Gutierrez
Assistant Examiner—Yaritza Guadalupe
(74) Attorney, Agent, or Firm—Christopher D. Gram; Robert W. Sprague

(57) ABSTRACT

A time-temperature indicator device provides a visually observable indication of the cumulative thermal exposure of an object. The device includes a substrate having a diffusely light-reflective porous matrix and a backing. The backing includes on its surface a viscoelastic indicator material for contacting the substrate and a barrier material for substantially inhibiting the lateral and longitudinal flow of viscoelastic indicator material between the substrate and the backing.

30 Claims, 3 Drawing Sheets

TIME-TEMPERATURE INTEGRATING INDICATOR DEVICE WITH BARRIER MATERIAL

This application is a continuation-in-part of U.S. patent application Ser. No. 09/069,576, filed Apr. 29,1998 now U.S. Pat. No. 6,244,208.

TECHNICAL FIELD

This invention relates to time-temperature integrating indicator devices that give a visual indication of the cumulative thermal exposure of an object by migrating a viscoelastic indicator material into a porous substrate at a temperature dependent rate, and to methods of making and using such devices.

BACKGROUND OF THE INVENTION

The useful life of a perishable product is a function of its cumulative thermal exposure, which is a combination of the temperatures to which the product is exposed and the duration of the exposure. Degradation reactions occur faster at higher temperatures than they do at lower temperatures. Therefore, a perishable product will have a longer useful life if it is exposed to lower temperatures than if it is exposed to higher temperatures. Perishable products include, but are not limited to, food, food additives, chemicals, biological materials, drugs, cosmetics, photographic supplies and vaccines.

Many manufacturers mark their products with printed expiration dates in an attempt to provide an indication of when the useful life of a perishable product ends. However, these dates are only estimates and are unreliable because they are based on assumptions about the thermal history of the product that may not be true with respect to a particular package on which they appear. Namely, in computing expiration dates, a manufacturer assumes that during its useful life a product will be kept at temperatures within a specific range prescribed for best results. However, if the actual temperatures of exposure are higher than those used in calculating the printed expiration date, the perishable item may the printed expiration date would mislead a consumer into believing the product was still usable when in fact it was past its useful life.

A time-temperature integrating indicator that gives a visually observable indication of the cumulative thermal exposure of a specific item, and hence overcomes the problems inherent with the use of marked expiration dates, is disclosed in U.S. Pat. No. 5,667,303, entitled "Time-Temperature Integrating Device," issued to Arens et al. (the '303 patent). The device of the '303 patent includes a first laminate wherein a substrate is coated with an opaque, porous matrix, and a second laminate having a backing material coated with a viscoelastic indicator material. The viscoelastic material and the porous matrix have the same, or approximately the same, indexes of refraction. The device is activated by placing the viscoelastic material and the substrate in contact with each other and mounting the combination on an object whose cumulative thermal exposure is to be monitored. The viscoelastic material progressively migrates into the porous matrix at a rate that increases with increasing temperature. As the microvoids of the opaque, porous matrix become filled with viscoelastic material, the porous matrix becomes transparent. The device thereby provides a visually observable indication that a predetermined cumulative thermal exposure associated with a change in the object (such as degradation or spoilage) has been met.

The visually observable indication in the device of the '303 patent occurs when the cumulative thermal exposure of the device is equal to the cumulative thermal exposure required to cause the degradation or other change being monitored in the test object. The viscoelastic material used in the indicator of the '303 patent is selected so that the run out time of the indicator, which is the time needed for the indicator to provide a visually observable indication, matches the time needed for the monitored change in the object to occur.

Matching the temperature dependence of the rates of change in the indicator device and the monitored object is accomplished by matching the Q10 or Ea of the viscoelastic material with the Q10 or Ea of the monitored object, according to the method described in the '303 patent. Q10 and Ea are both related to the temperature dependence of the rate of change of an object. Q10 is an indication of how much faster a reaction occurs in response to a 10° C. increase in temperature. Ea, or activation energy, is computed with reference to the Arrhenius Equation, $K = K_o \exp(-E_a/RT)$, where K=the rate constant at temperature T, Ko=the preexponential factor, R=the ideal gas constant and Ea=activation energy.

The first laminate and second laminate used in the indicator devices of the '303 patent are stored in separate rolls until needed for use. The indicator devices are constructed by cutting a length from each roll and placing the viscoelastic material of the second laminate in contact with the porous matrix of the first laminate.

One shortcoming of the indicator devices of the '303 patent is that some viscoelastic materials, in addition to migrating into the porous matrix, tend to flow laterally between the layers of the storage rolls and the indicator devices. In the storage rolls, the viscoelastic material flows laterally between the layers in the roll and forms a gooey accumulation on the sides of the rolls. This accumulation interferes with the operation of the laminating machine used to make the indicators. Furthermore, in the indicators the viscoelastic material flows out between the substrate and the backing and creates a sticky mess on both the indicator and the object to be monitored. As a result of the lateral flow of the viscoelastic material, the thickness of the viscoelastic material on the backing is rendered nonuniform.

Therefore, what is needed is a means to retain the advantages of the time temperature integrating indicators described in the '303 patent while preventing the viscoelastic material from flowing laterally between the backing and the substrate and oozing out of the indicator.

SUMMARY OF THE INVENTION

It is an objective of the present invention to overcome the shortcomings in the art by providing a time-temperature integrating indicator device wherein the backing material includes on its surface both a viscoelastic indicator material and a barrier material. The barrier material is provided to inhibit the lateral and longitudinal flow of the viscoelastic indicator material between the layers of the indicator device or between the layers in a storage roll.

In accordance with these objectives, the present invention provides a time-temperature integrating indicator device for providing a visually observable indication of cumulative thermal exposure, having a barrier material to prevent the lateral and longitudinal flow of viscoelastic indicator material. The device comprises a substrate and a backing. The substrate includes a diffusely light reflective porous matrix. The backing includes on its surface a viscoelastic indicator material for contacting the porous matrix and a barrier material for inhibiting the lateral flow of the viscoelastic indicator material between the substrate and the backing. The device has an unactivated state, in which the viscoelastic indicator material is substantially out of contact with the porous matrix, and an activated state in which the viscoelastic indicator material is in substantial contact with the porous matrix. In the activated state, the viscoelastic indicator material migrates into the porous matrix at a rate that increases with increasing temperature and thereby creates a visually observable indication of cumulative thermal exposure.

The invention also provides an embodiment in which the barrier material substantially inhibits both the lateral and the longitudinal flow of viscoelastic material regardless of whether the indicator device is in an activated state or an unactivated state.

The invention also provides an embodiment in which the barrier material used on the indicator device is a pressure sensitive adhesive. In another embodiment the barrier material is polystyrene. And, in yet another embodiment of the invention the barrier material is thermoplastic rubber.

The invention also provides a method of indicating the cumulative thermal exposure of an object, comprising the steps of providing a time-temperature integrating indicator device according to the invention, activating the device by placing the viscoelastic indicator material in substantial contact with the porous matrix, and mounting the device on an object, the thermal history of which is to be measured.

The invention also includes a striped viscoelastic indicator tape for use in a time-temperature integrating indicator device. The indicator tape includes a backing material having on its surface a viscoelastic indicator material and a barrier material. The viscoelastic indicator material is capable of penetrating a porous medium at a rate that increases with increasing temperature. The barrier material inhibits the lateral and longitudinal flow of viscoelastic indicator material between the backing and a surface with which it is in contact.

The invention also provides an embodiment of the striped viscoelastic indicator tape in which the barrier material substantially inhibits both the lateral and the longitudinal flow of viscoelastic material regardless of whether the indicator device is in an activated state or an unactivated state.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
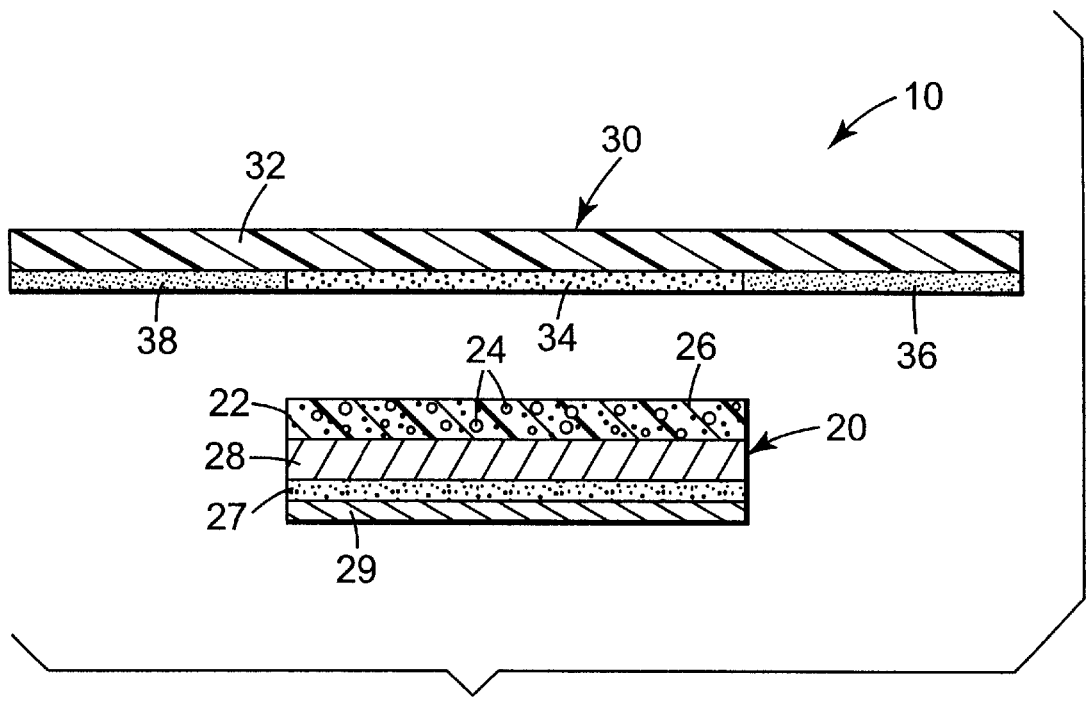
FIG. 1 is a cross-sectional view of the time-temperature integrating indicator device of the invention in an unactivated state.

The time-temperature integrating indicator device 10 of the present invention is shown in its unactivated state in FIG. 1. The indicator device 10 includes first laminate 20 and second laminate 30, which are not in contact with one another in the unactivated state.

The first laminate 20 includes a substrate 28 with a diffusely light-reflective porous matrix 22 provided on one of its surfaces. In one embodiment, an adhesive 27 is provided on the other surface of the substrate for mounting the indicator device 10 on an object whose cumulative thermal exposure is to be monitored. A release liner 29 may be placed in contact with adhesive 27 so that first laminate 20 can be rolled upon itself into storage rolls. The first laminate 20 is made using the materials and methods for constructing the first laminate of the time-temperature integrating indicator device described in U.S. Pat. No. 5,667,303, entitled "Time-Temperature Integrating Indicator," issued to Arens et al.

Second laminate 30 includes a light transmissive backing 32 having a viscoelastic indicator material on a central portion 34 and barrier material on two edge portions 36, 38 of the backing 32. By light-transmissive, it is meant that the backing material is sufficiently light-transmissive or translucent to allow a user of the indicator device 10 of the invention to visually observe the indication of cumulative thermal exposure through the backing. In one embodiment, the central portion 34 of the backing 32 is at least as wide as a cross section of the first laminate 20. In an alternative embodiment of the invention, backing 32 may include any number of alternating stripes of viscoelastic indicator material and barrier material.

Figure 2:
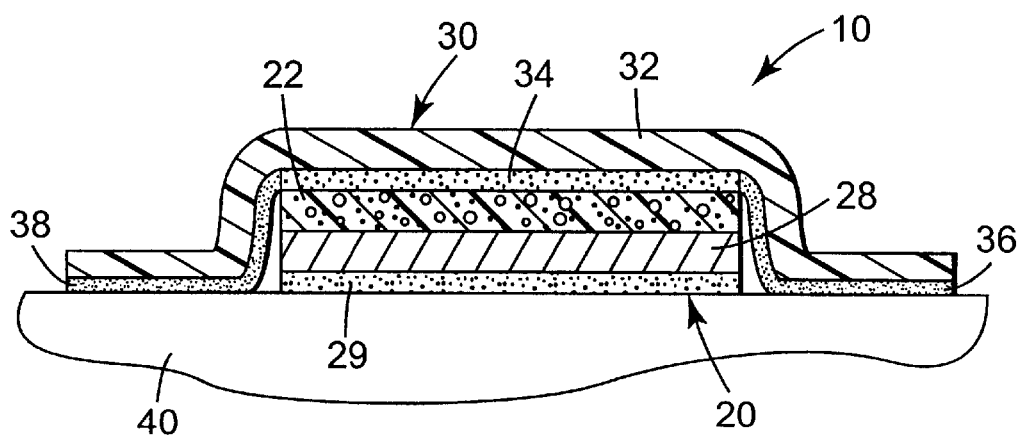
FIG. 2 is a cross-sectional view of the time-temperature integrating indicator device of the invention in an activated state.

As shown in FIG. 2, the indicator device 10 is activated by placing the viscoelastic indicator material 34 and the porous matrix 22 in substantial contact with one another. In one embodiment of the invention, the edge portions 36, 38 of the backing 32 overlap the porous matrix, and the barrier material inhibits the lateral flow of viscoelastic indicator material between the backing 32 and the porous matrix 22 and thereby prevents the viscoelastic indicator material from oozing out of the indicator device 10. In addition, when the second laminate 30 is rolled upon itself in a storage roll, the stripes of pressure sensitive adhesive provide a barrier that prevents viscoelastic indicator material from oozing out of the roll and accumulating on its sides.

Figure 5:
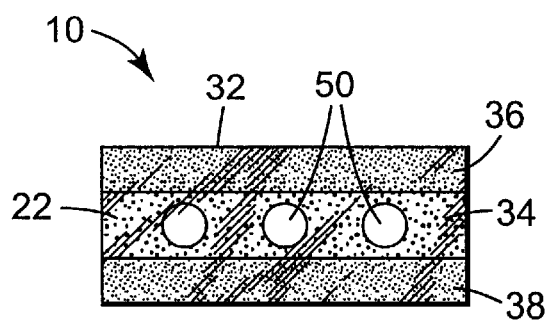
FIG. 5 is a top view of the time-temperature integrating indicator device of the invention, before migration of viscoelastic material is complete.

The barrier material may be any material that is capable of inhibiting the lateral flow of viscoelastic indicator material between the backing 32 and the porous matrix 22. The barrier material is a viscoelastic solid at all temperatures to which the indicator device 10 will be exposed. The barrier material may include a pressure sensitive adhesive. However, the barrier material cannot be the same material as the viscoelastic indicator material on the central portion 34 of the backing 32.

Where the barrier material on the edge portions 36, 38 is a pressure sensitive adhesive, the edge portions 36, 38 are placed in contact with the object to be monitored 40 so that the pressure sensitive adhesive mounts the indicator 10 on the object 40. The porous matrix 22 is thereby sandwiched between the backing 32 and the object 40, and the porous matrix 22 and the viscoelastic indicator material 34 are held securely in contact with one another. In this manner, the pressure sensitive adhesive on edge portions 36, 38 prevents the backing 32 from peeling away from the porous matrix 26 and rendering the indicator 10 inoperative. In addition, as best shown in FIGS. 2 and 5, when the indicator device 10 is activated and mounted on the object, the pressure sensitive adhesive on edge portions 36, 38 forms a barrier that inhibits viscoelastic indicator material from oozing out of the indicator device 10 between the first laminate 20 and second laminate 30.

After the indicator device 10 is activated the viscoelastic indicator material 34 progressively migrates into the porous matrix 22 at a temperature dependent rate and gradually fills the microvoids in the porous matrix 22. As the microvoids of the porous matrix become filled with viscoelastic indicator material, the porous matrix 22 is transformed from opaque to transparent and provides a visually observable indication of the cumulative thermal exposure of the indicator device 10. The visually observable indication of cumulative thermal exposure may include the appearance of latent indicia that were not visible before the viscoelastic indicator material 34 filled the microvoids of the porous matrix 22. The latent indicia are visible through the transparent backing 32, the viscoelastic indicator material 34, the porous matrix 22 and the substrate 28. In an alternative embodiment, the visually observable indication may also include the disappearance or obscuring of indicia that were visible before the microvoids were filled. In another embodiment, the visually observable indication may include a combination of the appearance of latent indicia and the obscuring of obscurable indicia. In yet another alternative embodiment, a color change may occur as the porous matrix 22 becomes transparent. Any of the methods described for providing a visually observable indication of cumulative thermal exposure in U.S. Pat. No. 5,667,303 may be used.

Figure 4:
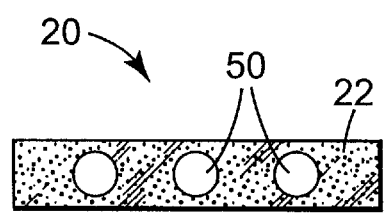
FIG. 4 is a top view of the substrate used in the time-temperature integrating indicator device of the invention.
Figure 6:
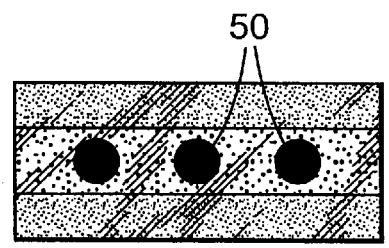
FIG. 6 is a top view of a time-temperature integrating indicator device of the invention, after the viscoelastic indicator material has migrated into the porous matrix.
Figure 7:
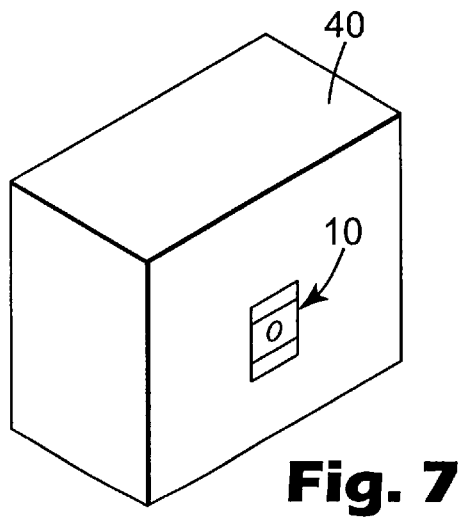
FIG. 7 is a perspective view of the time-temperature integrating indicator device of the invention mounted on an object whose cumulative thermal exposure is being monitored.

In a certain embodiment, a black substrate 28 or black adhesive 27 is used in the first laminate 20, which becomes visible as the porous matrix 22 becomes transparent. FIGS. 4–6 show a preferred embodiment of the invention in which a dye or ink is imprinted on the surface of the porous matrix 22 in a pattern that leaves only certain geometrically defined indication areas 50 uncoated and available to react with viscoelastic indicator material. FIG. 4 shows the first laminate of this embodiment prior to activation. FIG. 5 shows an activated indicator device 10 of this embodiment that has not yet accumulated sufficient thermal exposure to trigger a visually observable response in the indication areas 50. In FIG. 6, the same indicator device 10 is shown after the porous matrix 22 has become transparent and revealed a colored pattern 50 in the underlying adhesive 27 or substrate 28.

The porous matrix 22 may be any suitable microporous, diffusely light-reflective layer that can be made increasingly translucent or transparent by filling its voids with a material having an index of refraction close to that of the matrix. The porous matrix may be made using any of the materials and methods described for making the porous matrix disclosed in U.S. Pat. No. 5,667,303. In one embodiment, shown in FIG. 1, the porous matrix 22 includes a plurality of particles 24 in a binder 26. The binder 26 may have an index of refraction in the same range as the index of refraction of the particles 24. In certain embodiments, the binder 26 has an index of refraction that is substantially the same as the index of refraction of the particles 24.

Initially, the porous matrix 22 is opaque because its voids are filled with a material having an index of refraction that does not match the index of refraction of the rest of the matrix. Typically, the material is air, but it may be any other material that has an index of refraction that is different than that of the matrix 22. The viscoelastic indicator material 34 and the porous matrix 22 are selected to have indexes of refraction that are the same or close to the same. After activation of the indicator device 10, as the viscoelastic indicator material 34 gradually migrates into matrix 22, it displaces the air in the microvoids of the matrix 22 and the matrix 22 becomes increasingly light transmissive. When the microvoids become filled with viscoelastic indicator material 34, the matrix 22 becomes transparent or nearly transparent.

The indicator device 10 of the invention may be used to monitor a change in object 40 that is dependent on cumulative thermal exposure. The object 40 may be any object, such as a perishable item subject to degradation and spoilage in response to cumulative thermal exposure beyond certain definable limits. Such perishable items include, but are not limited to, foods, drugs, cosmetics, photographic supplies, and vaccines. In one embodiment, the indicator device 10 of the invention is used to give a visually observable indication when the cumulative thermal exposure of the indicator device 10 corresponds with the measured change, such as degradation, spoilage or loss of activity, in the object 40.

Figure 3:
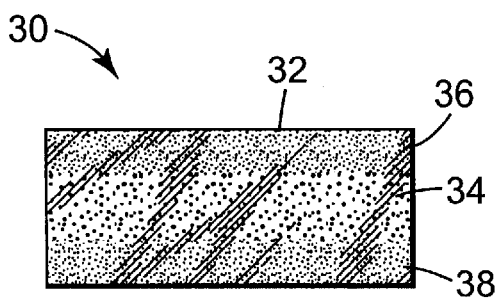
FIG. 3 is a top view of the backing used in the time-temperature integrating indicator device of the invention.

In certain embodiment of the invention, shown in FIGS. 1–3, the second laminate 30 is a striped viscoelastic indicator tape having a backing material 32 with a central stripe of viscoelastic indicator material 34 and two edge stripes 36, 38 of pressure sensitive adhesive. The backing 32 of the second laminate 30 may be sufficiently light transmissive or translucent to allow a user of the indicator 10 to visually observe the indication of cumulative thermal exposure through the backing 32. In certain embodiments, backing 32 is transparent. Backing 32 can comprise any suitable substrate such as glass, cellophane or film. For example, backing 32 may include a polymeric film such as a transparent film of poly (ethylene terphthlate) or polypropylene. Backing 32 may include a film such as low-density polyethylene when flexibility or conformance to contour is desired.

Viscoelastic indicator material 34 may comprise any suitable viscoelastic material that provides the desired properties for migration into the porous matrix 22 in response to cumulative thermal exposure, and which has an index of refraction in the same range as the particles 24 and the binder 26. In certain embodiments, the viscoelastic indicator material 34 is in a viscoelastic liquid state at all anticipated temperatures to which it will be exposed in the indicator device 10. This allows the viscoelastic indicator material to migrate into the porous matrix throughout the anticipated temperature range. Viscoelastic materials are in a viscoelastic liquid state at temperatures above their glass transition temperature Tg. A viscoelastic liquid is a viscoelastic material that continues to deform indefinitely when subjected to a shearing stress. It is possible for some viscoelastic solid materials to function as viscoelastic indicator material 34 provided that the material is able to deform and penetrate entirely through the porous matrix.

Viscoelastic indicator material 34 is selected in such a manner that the indicator run out time matches the time needed for the measured change in object 40 to occur. The viscoelastic indicator material is selected in accordance with the methods described above and in U.S. Pat. No. 5,667,303, by matching the Q10 of the viscoelastic indicator material with the Q10 of the object to be monitored 40, or, alternatively, by matching the Ea of the viscoelastic indicator material with the Ea of the object to be monitored 40.

An illustrative, but by no means exclusive, list of viscoelastic materials that may be suitable for use as the viscoelastic indicator material of the present invention includes natural rubber, polybutadiene and its copolymers with acrylonitrile and styrene, poly alpha olefins such as polyhexene, polyoctene, and copolymers of these and others, polyacrylates, polychloroprene, silicone elastomer, and block copolymers such as styrene-isoprene block copolymers, and mixtures of any of the above. The viscoelastic indicator material can comprise, for example, a polyisoprene, atactic polypropylene, polybutadiene, polyisobutylene, silicone, ethylene vinyl acetate, or a polyacrylate, and can typically include a tackifying agent and/or a plasticizing agent. The viscoelastic indicator material can comprise adhesive including isooctyl acrylate (IOAK) or isooctyl acrylate/acrylic acid (IOA/AA) based pressure sensitive adhesive. The adhesives suitable for use as the viscoelastic indicator material of the invention may be prepared from pressure sensitive adhesive compositions comprising from abut 50 to 100 parts by weight of at least one alkyl acrylate monomer, and correspondingly, from about 50 to 0 parts by weight of an optional reinforcing comonomer. Throughout this application, compositions are described in percentages or ratios by weight, unless indicated otherwise.

Monomers useful in preparing the viscoelastic indicator material of the invention are those that have a homopolymer glass transition temperature less than about 0° C. Useful alkyl acrylates are unsaturated monofunctional (meth) acrylic acid esters of non-tertiary alkyl alcohols having from 2 to 20 carbon atoms in the alkyl moiety, preferably from 4 to 18 carbon atoms, and more preferably, from 4 to 12 carbon atoms. Examples of useful alkyl acrylate monomers includes, but are not limited to, n-butyl acrylate, hexyl acrylate, octyl acrylate, isooctyl acrylate, 2-ethylhexyl acrylate, isononyl acrylate, decyl acrylate, dodecyl acrylate, lauryl acrylate, octadecyl acrylate, and mixtures thereof.

The optional reinforcing co-monomer in the viscoelastic indicating material is a monoethylenically unsaturated monomer having a homopolymer glass transition temperature greater than about 25° C., and may be co-polymerized with the acrylate monomers. Examples of useful co-polymerizable monomers include, but are not limited to, meth(acrylic) acid, N-vinyl pyrrolidone, N-vinyl caprolactam, substituted (meth)acrylamides, such as N,N,-dimethyl acrylamides, acrylonitrile, isobornyl acrylate, and mixtures thereof. When a co-polymerizable monomer is used, the alkyl acrylate is present in the composition in amounts from about 50 to 99 parts by weight and the co-polymerizable monomer is present in corresponding amounts from 50 to 1 parts by weight wherein the total amount by weight is 100.

A suitable polar IOA/AA adhesive for use as the viscoelastic indicator material of the present invention contains a weight ratio of IOA/AA of from about 80/20 to 98/2. Useful IOA/AA based pressure sensitive adhesives includes those having ratios of 90/10 and 94/6. Other useful pressure sensitive adhesives include non polar copolymers of isooctyl acrylate/methacrylate (IOA/MA), isooctyl acrylate/ isobornyl acrylate (IOA/IBA), or ethyl acrylate/methyl acrylate (EA/MA). The pressure sensitive adhesive used as the viscoelastic indicator material can include an added tackifier and/or plasticizer in a tackifier to adhesive base weight ratio or a plasticizer to adhesive base weight ratio of up to about 2:1. Suitable tackifiers include hydrogenated rosin esters commercially available as Foral 85™, Foral 105™, or Abitol™ E, and hydrocarbon tackifiers such as Regalrez™, all available from Hercules Incorporated of Wilmington, Del. Suitable plasticizers include hydrocarbon oils such as Shellflex™ (available from Shell Chemical Co.), USP grade mineral oil, phthalate and diisononyl phthalate, and allyl phthalates.

The barrier material on the edge stripes 36, 38 of the backing 32 may suitably be any material capable of preventing the viscoelastic indicator material 34 from flowing laterally between the backing 32 and the porous matrix 22, or alternatively between the successive layers of backing 32 in a storage roll, and oozing out of the indicator device 10 or the storage roll. In certain embodiments, the barrier material is a viscoelastic solid in the temperature range in which the indicator device 10 will be used. A viscoelastic solid is a material that resists flow when subjected to a constant shearing stress. Suitable barrier materials for use in the indicator device 10 include glassy polymers, semi-crystalline polymers, physically and chemically crosslinked elastomers, segmented polyesters, radiation crosslinked polybutadiene, and pressure sensitive adhesives. Examples of suitable glassy polymers include polystyrene and polymethyl methacrylate. Examples of suitable semi-crystalline polymers include polyethylene, polypropylene and polyesters. Examples of suitable physically crosslinked elastomers include triblock copolymers, such as styrene-isoprene-styrene block copolymers, and segmented polyurethane elastomers. An example of a suitable chemically cross-linked elastomer is sulfur crosslinked natural rubber.

In one embodiment of the invention, the barrier material is a pressure sensitive adhesive that is a viscoelastic solid in the temperature range in which the indicator device 10 will be used. The pressure sensitive adhesive should be one that will not readily flow or ooze out of a storage roll or an indicator in the range of temperatures to which it will likely be exposed. Suitable pressure sensitive adhesives that may be used as barrier materials in the indicator device 10 include acrylic pressure sensitive adhesives, silicone pressure sensitive adhesives, rubber resin blend pressure sensitive adhesives, triblock copolymer pressure sensitive adhesives, and vinyl ether polymer pressure sensitive adhesives. Suitable rubber resin blend pressure sensitive adhesives include natural rubber, polybutadene, polyisobutalene, styrene butadiene random copolymers, synthetic polyisoprene, and butyl rubber. Suitable triblock copolymer pressure sensitive adhesives include styrene-isoprene-styrene copolymers, styrene-butadiene-styrene copolymers, styrene-ethylenebutylene-styrene copolymers, and styrene-ethylene propylene-styrene copolymers. The pressure sensitive adhesive used as a barrier material 36, 38 must be a different material than the viscoelastic indicator material 34 used in indicator device 10.

The striped indicator tape of the invention is made by simultaneously coating barrier material and viscoelastic indicator material onto a backing using a dual manifold die. The die includes a faceplate and a back manifold section, which is divided into an upper manifold and a lower manifold. One of the manifolds is used for storage and delivery of barrier material and the other is used for storage and delivery of viscoelastic indicator material. Precision gear pumps are used to supply the barrier material, such as a pressure sensitive adhesive, and the viscoelastic indicator materials to the manifold. The face plate has a series of orifices that deliver barrier material to the backing 32 to form edge stripes 36, 38 and a separate set of orifices to deliver the viscoelastic indicator material to the backing 32 to form the indicator stripe 34. The indicator stripe orifices are in horizontal alignment with the barrier orifices on the faceplate. A total of three indicator stripes bordered by a PSA stripe on each side can be coated simultaneously. The striped coating is dried with a forced air oven. The coated film backing is laminated on the coated side to a silicone-treated paper release liner (BL 55 CC2 Silox B2J/0 Paper, Akrosil, Manasha, Wis.) and the resulting sheet converted by slitting down the middle of each PSA stripe to provide strips of the second laminate.

Figure 8:
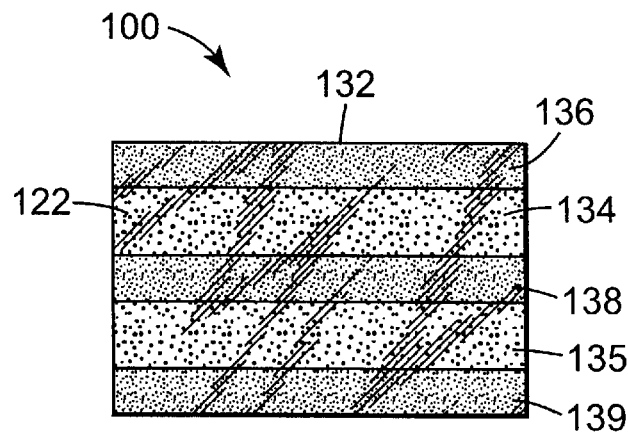
FIG. 8 is a top view of a time-temperature integrating indicator device of the invention.

FIG. 8 shows an alternative embodiment of the indicator device 100 of the invention in which the backing 132 has two indicator stripes 134 and 135, which are bordered by barrier stripes 136, 138 and 139. The indicator stripes 134 and 135 may have different viscoelastic indicator materials or the same viscoelastic indicator material. In addition, the barrier stripes 136, 138 and 139 may have different barrier materials than each other, or may have the same barrier material. Although FIG. 8 illustrates an indicator with alternating indicator and barrier stripes in which there are two indicator stripes, the invention is not limited to any particular number of alternating stripes, since the principles set forth herein can readily be applied to make indicators having any number of indicator stripes.

Figure 9:
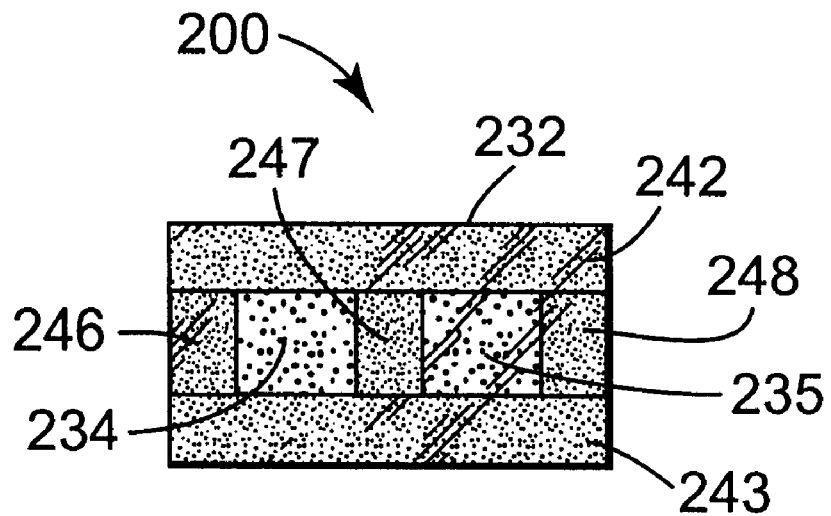
FIG. 9 is a top view of another time-temperature integrating indicator device of the invention.

FIG. 9 shows another alternative embodiment of the indicator device 200 of the invention in which the backing 232 has two indicator areas 234 and 235, which are bordered by two horizontal barrier stripes 242 and 243 and by three vertical barrier stripes 246, 247, and 248. The indicator areas 234 and 235 may have different viscoelastic indicator materials or the same viscoelastic indicator material. In addition, the barrier stripes 242, 243, 246, 247, and 248 may have different barrier materials than each other, or may have the same barrier material. Although FIG. 9 illustrates an indicator device with a backing having a single indicator/barrier stripe bordered by two barrier stripes, the invention is not limited to any particular number of alternating stripes, since the principles set forth herein can readily be applied to make indicator devices having any number of alternating indicator/barrier and barrier stripes.

Figure 10:
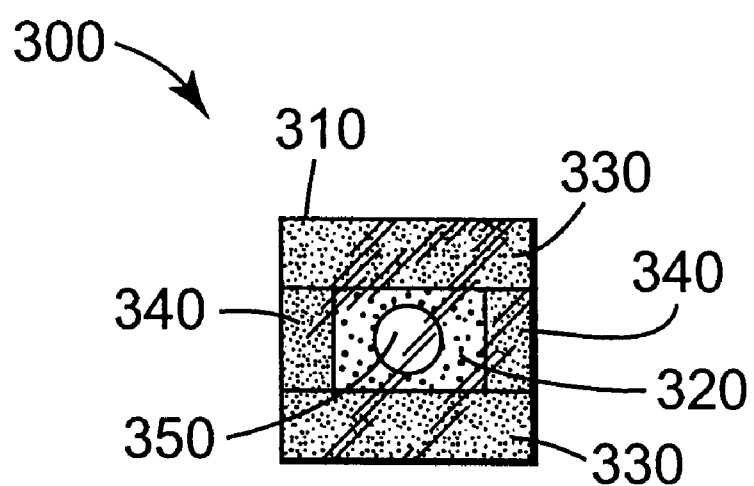
FIG. 10 is a top view of another time-temperature integrating indicator device of the invention, before migration of viscoelastic material is complete.

FIG. 10 shows the top view of an activated indicator device 300 of the invention similar to the devices shown in FIG. 2 and FIG. 5, except that the backing 310 has a single viscoelastic indicator area 320 bordered by horizontal barrier stripes 330 and vertical barrier stripes 340. The backing 310, as one alternative, could be constructed by die cutting the backing 232 (FIG. 9). The device 300 is activated by placing the viscoelastic indicator material of backing 310 and the porous matrix 22 (of the first laminate 20) in substantial contact with one another. In one embodiment of the invention, the edges of the backing 310 overlap the porous matrix 22 and the barrier stripes 330 and 340 inhibit both the lateral and longitudinal flow of viscoelastic indicator material between the backing 310 and the first laminate 20 and thereby prevents the viscoelastic indicator material from oozing out of the indicator device 300. FIG. 10 shows an activated indicator device 300 of this embodiment that has not yet accumulated sufficient thermal exposure to trigger a visually observable response in the indicator view area 350. After sufficient thermal exposure, the indicator view area 350 would, for example, begin to darken (not shown).

The operation of the present invention will be further described with regard to the following detailed examples. These examples are offered to further illustrate the various specific and preferred embodiments and techniques. It should be understood, however, that many variations and modifications maybe made while remaining within the scope of the present invention.

EXAMPLES

The following examples are offered to aid in understanding of the present invention and are not to be construed as limiting the scope thereof. Unless otherwise indicated, all parts and percentages are by weight.

Indicator Compositions A and B

Viscoelastic indicator compositions A and B were prepared by mixing together the ingredients as listed in Tables 1 and 2, respectively.

Barrier PSA Composition

A PSA composition was prepared by mixing together the ingredients listed in Table 3.

TABLE 1

Indicator Composition A

| Ingredient | Parts (by Wt.) |
|---|---|
| Polyisoprene LIR-50 (Kuraray Co., Tokyo, Japan) | 11 |
| Hydrocarbon resin ARKON ™ P-115 (Arakawa Chemical Industries Ltd., Osaka, Japan) | 15 |
| Resin tackifier REGALREZ ™ 1018 (Hercules, Inc., Wilmington, DE) | 13 |
| IRGANOX ™ 1010 antioxidant (Ciba-Geigy, Tarrytown, NY) | 0.4 |
| Toluene | 60 |

TABLE 2

Indicator Composition B

| Ingredient | Parts (by Wt.) |
|---|---|
| KRATON ™ G1750 ethylene propylene copolymer (Shell Chemical Co., Houston, TX) | 11 |
| Resin tackifier REGALREZ ™ 1085 (Hercules, Inc.) | 10 |
| Resin tackifier REGALREZ ™ 1018 (Hercules, Inc.) | 19 |
| IRGANOX ™ 1010 antioxidant | 0.4 |
| Toluene | 60 |

TABLE 3

Barrier PSA Composition

| Ingredient | Parts (by Wt.) |
|---|---|
| KRATON ™ G1107 styrene-isoprene-styrene block copolymer (Shell Chemical) | 20 |
| WINGTACK ™ PLUS hydrocarbon tackifying resin (Goodyear Tire and Rubber Co., Akron, OH) | 20 |
| Toluene | 60 |

First Laminate

A calcium carbonate dispersion was prepared by mixing together the ingredients listed in Table 4. The dispersion was coated onto a corona-treated, low-haze, 1.4-mil poly (ethyleneterephthalate) (PET) transparent film with conventional Gravure coating equipment and subsequently dried in a forced air oven for about 3 minutes at 100° C. to produce a dry microporous coating approximately 13 microns thick. A black adhesive (A842 Acrylate Adhesive with Carbon Black, 3M Company, St. Paul, Minn.) was then coated on the uncoated side of the PET film with conventional knife coating equipment and subsequently dried in a forced air oven for about 1 minute at 100° C. to produce a dry coating of about 25 microns thick. A silicone-treated 1.4-mil PET film release liner was then laminated (room temperature, pressure about 138 KPa) to the black adhesive side of the PET film to prevent unintended adhesion to other surfaces.

TABLE 4

Calcium Carbonate Dispersion

| Ingredient | Parts (by Wt.) |
|---|---|
| Calcium Carbonate, particle size distribution: 0.0005 to 0.015 mm (Dryca Flo 125, Sylacauga Calcium Products, Sylacauga, AL) | 37.44 |
| Acrylic Binder (Carboset 526, B. F. Goodrich, Akron, OH) | 3.16 |
| Dowicide A Antimicrobial Agent (Dow Chemical, Midland, MI) | 0.14 |
| Ethanol | 12.96 |
| Ammonium Hydroxide (2%) | 0.44 |
| Water | 45.85 |

Example 1

Alternating stripes of Indicator Composition B ("indicator stripe") and Barrier PSA Composition ("PSA stripe") were coated simultaneously onto an untreated, low-haze, 1.4-mil polyester PET transparent film backing by utilizing a dual manifold die. Briefly, the die included a face plate and back manifold section having two separate manifolds, one in the upper part of the back section and the other in the lower part of the back section. A precision gear pump was used to supply the PSA composition to the top manifold and another precision gear pump was used to supply the indicator composition to the bottom manifold. Each pump could be adjusted independently to control flow rate of the compositions to the die. The faceplate was constructed with precision orifices having a 1.0 mm diameter and 1.1 mm center-to-center spacing. To obtain one PSA stripe about 2.5-cm wide, a series of orifices were placed at an angle such that the inlet of the orifices in the back of the face plate was aligned with the top manifold and the outlet of the orifices on the front side of the face plate were approximately 1.3 mm below a sharp notch. Positioned next to these orifices were a series of orifices, extending through to the lower manifold, for coating an indicator stripe about 1.2-cm wide. These indicator stripe orifices were in horizontal alignment with the PSA stripe orifices on the front of the faceplate. This pattern was repeated across the face of the die so that a total of three indicator stripes bordered by a PSA stripe on each side could be coated simultaneously. Different spacing of orifices and/or number of stripes could be achieved by machining a new faceplate and utilizing the existing back manifold section. The die was run in the fluid-bearing mode, with the die positioned in contact with a free span of web located between two idler rolls attached to the die stand. The die was mounted in an assembly on a precision die mount that allowed for adjustment of the engagement of the die with the web and also allowed for rotational adjustment of the die relative to the web.

The striped coating was dried by utilizing a forced air oven located directly after the die station to provide a dry coating thickness of about 25 microns. Movement through the oven was at a rate of about 6 m/minute and the oven had three zones, which were heated to 79° C., 121° C., and 135° C., respectively. The coated film backing was then laminated on the coated side to a silicone-treated paper release liner (BL 55 CC2 Silox B2J/0 Paper, Akrosil, Manasha, Wis.) and the resulting sheet was converted by slitting down the middle of each PSA stripe to provide strips of the second laminate. Each strip included a center indicator stripe about 1.2 cm wide bordered on each side by a PSA stripe about 1.25-cm wide.

A time-temperature integrating device was prepared and activated by placing an about 5-cm long strip of the second laminate (with paper release liner removed and striped coating side down) onto an about 5-cm long strip of the first laminate (with microporous coating side up) and laminating the two strips together by immediately rolling down with a 5-cm wide hand roller. A strong, permanent adhesive bond was observed to form between the two laminates. The device was then measured for optical image.

The optical density (OD) of the time-temperature integrating device was measured over time at room temperature (about 23° C.) using a densitometer (X-RITE™ Model 404, X-Rite Inc., Grandville, Mich.). The OD values provide a darkness measurement of the center indicator stripe of the device with a value of about 0.4 appearing light gray and a value of about 0.7 appearing nearly black. The width of the darkening center indicator stripe was measured at the same time that OD was measured. The results are provided in Table 5 and show that OD exceeded 0.7 at 140 hr. Additionally, the width (1.2 cm) of the center indicator stripe did not increase with time, which indicates that the indicator material was confined by the two PSA edge stripes.

TABLE 5

| Time (Hours) | Optical Density | Indicator Stripe Width (Cm) |
|---|---|---|
| 0 | 0.42 | 1.2 |
| 23 | 0.55 | 1.2 |
| 47 | 0.61 | 1.2 |
| 101 | 0.68 | 1.2 |
| 144 | 0.73 | 1.2 |

Example 2

A time-temperature integrating device was prepared and activated as described in Example 1, except that Indicator Composition A was substituted for Indicator Composition B in the construction of the second laminate. It was observed over time at room temperature that the center indicator stripe of the device darkened, while the width of the stripe remained unchanged.

Example 3

A time-temperature integrating device was prepared and activated as described in Example 2, except that the silicone-treated PET film release liner was substituted for the silicone-treated paper release liner in the construction of the second laminate. It was observed over time at room temperature that the center indicator stripe of the device darkened, while the width of the stripe remained unchanged.

Example 4

Alternating stripes of Indicator Composition A and Barrier PSA Composition were coated simultaneously onto silicone-treated paper release liner by utilizing a dual manifold die as described in Example 1. The striped coated paper release liner was dried as described in Example 1 and then laminated (to the silicone-treated side) to an untreated, low-haze, 1.4-mil PET transparent film backing. The resulting sheet was converted by slitting down the middle of each PSA stripe to provide strips of the second laminate. Each strip was coated with an about 1.2-cm wide center indicator stripe bordered on each side with an about 1.25-cm wide PSA stripe.

A time-temperature integrating device was prepared and activated by placing an about 5-cm long strip of the second laminate (with paper release liner removed and striped coating side down) onto an about 5-cm long strip of the first laminate (with microporous coating side up) and laminating the two strips together by immediately rolling down with a 5-cm wide hand roller. It was observed over time at room temperature that the center indicator stripe of the device darkened, while the width of the stripe remained unchanged.

Example 5

A time-temperature integrating device was prepared and activated as described in Example 4, except that Indicator Composition B was substituted for Indicator Composition A in the construction of the second laminate. It was observed over time at room temperature that the center indicator stripe of the device darkened, while the width of the stripe remained unchanged.

Example 6

A time-temperature integrating device was prepared and activated as described in Example 5, except that the silicone-treated PET film release liner was substituted for the silicone-coated paper release liner in the construction of the second laminate. It was observed over time at room temperature that the center indicator stripe of the device darkened, while the width of the stripe remained unchanged.

Example 7

A time-temperature integrating device was prepared and activated as described in Example 5, except that biaxially oriented polypropylene (BOPP) transparent film backing was substituted for the PET transparent film backing in the construction of the second laminate. It was observed over time at room temperature that the center indicator stripe of the device darkened, while the width of the stripe remained unchanged.

Example 8

Time-temperature integrating devices were prepared and activated as described in Example 4 except that gear pumping speeds were adjusted so that different amounts of coatings were applied to the silicone-treated paper release liner to provide separate samples having dry coating thicknesses of 17, 31, 44, and 50 microns. It was observed over time at room temperature that the center indicator stripe of each device darkened, while the width of the stripe remained unchanged.

Example 9

Time-temperature integrating devices were prepared as described in Example 2, except that a color reference was printed on the microporous coating of the first laminate. The color reference was printed with a gray ink made from a mixture of gray (SSK-15125) and black (SSK-6862) inks available from Werneke Ink, Plymouth, Minn. Utilizing conventional flexographic techniques, the microporous layer was printed so that circular areas were left unprinted within the printed regions. The unprinted circular areas were 4-mm in diameter and were 15 mm apart (center to center). Strips of the first and second laminates were laminated together as described in previous examples and then cut to provide 5.5-mm×16-mm devices having a center indicator stripe about 12-mm wide bordered on each side with an about 2-mm wide PSA stripe, and an unprinted 4-mm diameter circular area positioned in the center of each device. Immediately after lamination ("activation") of the device, the area within the unprinted circle appeared light gray and much lighter in color than the surrounding gray printed reference region. The device was then left in an incubator at 50° C. for about one hour during which time the area within the circle became much darker in color (nearly black) than the surrounding printed reference region.

Example 10

Alternating stripes of Indicator Composition B ("indicator stripe") and a Non-Tacky Composition containing 40% (by wt.) polystyrene (PS666, Dow Chemical) dissolved in toluene ("non-tacky stripe") were coated simultaneously onto a PET transparent film backing by utilizing a dual manifold die as described in Example 1. The striped, coated film backing was dried as described in Example 1 to provide a dry coating thickness of about 25 microns. The dried non-tacky stripes did not feel sticky (tacky) when touched by a finger. The dried film backing was then laminated on the coated side to a silicone-treated paper release liner and the resulting sheet was converted by slitting down the middle of each non-tacky stripe to provide strips of the second laminate. Each strip was coated with an about 1.4-cm wide center indicator stripe bordered on each side with an about 1.25-cm wide non-tacky stripe.

A time-temperature integrating device was prepared and activated by placing an about 5-cm long strip of the second laminate (with paper release liner removed and striped coating side down) onto an about 7-cm long strip of the first laminate (with microporous coating side up) and laminating the two strips together by immediately rolling down with a 5-cm wide hand roller. It was observed that the indicator stripe, but not the two non-tacky stripes, had adherence to the microporous layer of the first laminate, and that, due to the overall weak adhesion, the whole second laminate could be separated from the first laminate by gentle hand pulling. Another strip of the second laminate (with paper release liner removed and striped coating side down) was more permanently secured to a strip of the first laminate by hand-rolling on top a 5-cm wide strip of box sealing tape (Product No. 351, 3M Company, St. Paul, Minn.). With the adhesion provided by the box sealing tape, the second laminate could not be separated from the first laminate by hand. It was observed over time at room temperature that the center indicator stripe of the device darkened, while the width of the stripe remained unchanged.

Example 11

A time-temperature integrating device was prepared and activated as described in Example 10, except that 40% (by wt.) KRATON™ G1750 dissolved in toluene was used as the Non-Tacky Composition in construction of the second laminate. As in Example 10, the dried non-tacky stripes did not feel sticky (tacky) when touched by a finger, and the box sealing tape was used to more permanently adhere the first and second laminates together. It was observed over time at room temperature that the center indicator stripe of the device darkened, while the width of the stripe remained unchanged.

Example 12

A time-temperature integrating device was prepared as described in Example 1, except that the second laminate, striped coating process was carried out using a face plate constructed to produce alternating indicator stripes about 4-mm wide and PSA stripes about 4-mm wide. Strips of the first and second laminates were laminated together ("activated") as described in previous examples and then cut to provide an approximately 50-mm×100-mm device having 25 alternating indicator and PSA stripes. It was observed over time (about two weeks) at room temperature that the indicator stripes of the device darkened, while the width of the indicator stripes remained unchanged.

For comparative purposes, a second time-temperature integrating device was prepared as described in the previous paragraph, except that no PSA was coated between the indicator stripes. Therefore, the final device had 25 alternating indicator stripes and uncoated stripes. It was observed over time (about two weeks) at room temperature that the indicator stripes of the device darkened, while the width of the indicator stripes increased from about 4 mm to about 5–6 mm.

Example 13

Comparative time-temperature integrating devices were prepared as described in Example 12, except that Indicator Composition A was substituted for Indicator Composition B. Results were similar to those described in Example 12, except that the width of the indicator stripes of the device having no PSA coated between the indicator stripes increased from about 4 mm to greater than 6 mm over the two week observation period.

The results of Examples 12 and 13 support the conclusion that the PSA border stripes within the time temperature integrating devices prevent lateral migration of the viscoelastic indicator striped coatings over time.

Example 14

Viscoelastic indicator composition C was prepared by mixing together the ingredients as listed in Table 6.

TABLE 6

Indicator Composition C

| Ingredient | Parts (by Wt.) |
| --- | --- |
| KRATON ™ G1750 ethylene propylene copolymer (Shell Chemical) | 11 |
| Resin tackifier REGALREZ ™ 1085 (Hercules, Inc.) | 23 |
| Mineral Oil | 6 |
| IRGANOX ™ 1010 antioxidant (Ciba-Geigy) | 0.4 |
| Toluene | 60 |

Patches of Indicator Composition C ("indicator") surrounded by Barrier PSA Composition ("PSA") were coated simultaneously onto an untreated, low-haze, 1.4-mil (36 microns) polyester PET transparent film backing by utilizing a multi-material pressure feed coating die similar to the die disclosed in U.S. Pat. No. 4,756,271 entitled "Coating Die", issued to Maier. Briefly, the die is comprised of a body with multiple fluid chambers, which are connected to inlet ports and a die opening or slot. A movable cam is positioned in the fluid chambers. By rotating the cam, different inlet ports are connected to the die slots. This permits the application of different materials in the same down web stripe. The die was set-up to coat three 19-mm wide stripes with 1.5 mm between stripes. The cam was constructed with 1.5-mm wide baffles between cam partitions. The top and bottom outside stripe fluid chambers were connected to a pump, which supplied the PSA. With this arrangement continuous stripes of PSA coating exited the outside die slots. The indicator was supplied to the top of the middle stripe fluid chamber and the PSA was supplied to the bottom of the middle slot fluid chamber. By rotating the cam PSA or indicator exited the die from the middle slot. An actuator with a controller was connected to the die. The cam rotation was controlled to produce 12.7-mm long indicator patches and 7.6-mm long PSA patches (pitch of 20.3 mm). The die was mounted in an assembly on a precision die mount that allowed for adjustment of the engagement of the die with the web and also allowed for rotational adjustment of the die relative to the web.

The coated film backing was dried by utilizing a forced air oven located directly after the die station to provide a dry coating thickness of about 25 microns. Movement through the oven was at a rate of about 6 m/minute and the oven had two zones, which were heated to 95° C. and 115° C., respectively. The coated film backing was then laminated on the coated side to a silicone-treated paper release liner.

A time-temperature integrating device was prepared and activated. A 20.3-mm long section of the second laminate (backing) was cut from the web. The cut lines passed through the middle of the PSA patches in the center stripe. This gave a second laminate with a 12.7-mm×19-mm patch of indicator surrounded by PSA. This second laminate (with the liner removed) was laminated to a 20.3-mm×60-mm strip of the first laminate (substrate with microporous coating side up). A strong, permanent adhesive bond was observed to form between the two laminates. It was observed that over time at room temperature the patch of indicator material darkened, while the surrounding PSA areas remained unchanged.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the language of the claims set forth herein as follows.

What is claimed is:

1. A time-temperature integrating indicator device for providing a visually observable indication of the cumulative thermal exposure of an object, said device comprising:
   (a) a substrate having a diffusely light-reflective porous matrix; and
   (b) a backing including on its surface a viscoelastic indicator material for contacting said porous matrix, and a barrier material for substantially inhibiting the lateral and longitudinal flow of viscoelastic material regardless of whether the indicator device is in an activated state or unactivated state;

wherein the device is in the unactivated state when the viscoelastic indicator material is out of contact with the porous matrix; and wherein the device is in the activated state when the viscoelastic indicator material is in contact with the porous matrix such that the viscoelastic indicator material migrates into the porous matrix at a rate that increases with increasing temperature, thereby creating a visually observable indication of cumulative thermal exposure.

2. The device of claim 1 wherein the barrier material comprises a pressure sensitive adhesive.

3. The device of claim 2 wherein the backing includes on its surface alternating strips of the viscoelastic indicator material and the pressure sensitive adhesive.

4. The device of claim 2 wherein the backing includes on its surface a central stripe of the viscoelastic indicator material, one edge stripe of the pressure sensitive adhesive on each side of the central stripe, and one edge stripe of the pressure sensitive adhesive on at least one end of the central stripe.

5. The device of claim 2 wherein the pressure sensitive adhesive is selected from the group consisting of acrylic pressure sensitive adhesives, silicone pressure sensitive adhesives, rubber resin blend pressure sensitive adhesives, triblock copolymer pressure sensitive adhesives, and vinyl ether polymer pressure sensitive adhesives.

6. The device of claim 1 wherein the barrier material is selected from the group consisting of glassy polymers, semi-crystalline polymers, physically crosslinked elastomers, chemically crosslinked elastomers, segmented polyesters, radiation crosslinked polybutadiene, and pressure sensitive adhesives.

7. The device of claim 1 wherein the visually observable indication comprises a color change.

8. The device of claim 1 wherein the visually observable indication comprises the appearance of latent indicia in the activated state that are not visible in the unactivated state.

9. The device of claim 1 wherein the visually observable indication comprises the obscuring of indicia in the activated state that are visible in the unactivated state.

10. The device of claim 1 wherein the barrier material comprises polystyrene.

11. The device of claim 1 wherein the barrier material comprises thermoplastic rubber.

12. A method of providing an indication of the cumulative thermal exposure of an object, comprising the steps of:
(a) providing a time-temperature integrating indicator device comprising:
  (i) a substrate having a reflective porous matrix; and
  (ii) a backing including on its surface a viscoelastic indicator material for contacting said porous matrix, and a barrier material for substantially inhibiting the lateral and longitudinal flow of viscoelastic indicator material regardless of whether the indicator device is in an unactivated state or an activated state,
  wherein the device is in the unactivated state when the viscoelastic indicator material is out of contact with the porous matrix, and
  wherein the device is in the activated state when the viscoelastic indicator material is in contact with the porous matrix such that the viscoelastic indicator material migrates into the porous matrix at a rate that increases with increasing temperature, thereby creating a visually observable indication of cumulative thermal exposure;

(b) activating said device by placing said viscoelastic indicator material in contact with said porous matrix such that said viscoelastic indicator material migrates into said porous matrix at a rate which increases with increasing temperature and creates a visually observable indication of cumulative thermal exposure; and (c) mounting the device on an object whose cumulative thermal history is to be measured.

13. The method of claim 12 wherein the barrier material is a pressure sensitive adhesive.

14. The method of claim 13 wherein the device is mounted on the object by placing said pressure sensitive adhesive in contact with the object.

15. The method of claim 13 wherein the backing includes on its surface alternating stripes of the viscoelastic indicator material and the pressure sensitive adhesive.

16. The method of claim 13 wherein the backing includes on its surface a central stripe of the viscoelastic indicator material, one edge stripe of the pressure sensitive adhesive on each side of the central stripe, and one edge stripe of the pressure sensitive adhesive on at least one end of the central stripe.

17. The method of claim 13 wherein the pressure sensitive adhesive is selected from the group consisting of acrylic pressure sensitive adhesives, silicone pressure sensitive adhesives, rubber resin blend pressure sensitive adhesives, triblock copolymer pressure sensitive adhesives, and vinyl ether polymer pressure sensitive adhesives.

18. The method of claim 12 wherein the barrier material is selected from the group consisting of glassy polymers, semi-crystalline polymers, physically crosslinked elastomers, chemically crosslinked elastomers, segmented polyesters, radiation crosslinked polybutadiene, and pressure sensitive adhesives.

19. The method of claim 12 wherein the visually observable indication comprises the appearance of latent indicia that are not visible before activating the device.

20. The method of claim 12 wherein the visually observable indication comprises a color change.

21. The method of claim 12 wherein the barrier material comprises polystyrene.

22. The method of claim 12 wherein the barrier material comprises thermoplastic rubber.

23. A striped viscoelastic indicator tape for use in a time-temperature integrating indicator device having a substrate with a diffusely light-reflective porous matrix, said device for providing a visually observable indication of the cumulative thermal exposure of an object, said indicator tape comprising:
(a) a backing material;
(b) a viscoelastic indicator material on a portion of the surface of the backing material, capable of penetrating the porous matrix at a rate that increases with increasing temperature; and
(c) a barrier material on a portion of the surface of the backing material for substantially inhibiting the lateral and longitudinal flow of viscoelastic indicator material between the backing and another surface when the device is in an unactivated state, wherein the device is in the unactivated state when the viscoelastic indicator material is out of contact with the porous matrix.

24. The striped tape of claim 23 wherein the barrier material comprises a pressure sensitive adhesive.

25. The striped tape of claim 24 wherein the backing material includes on its surface alternating stripes of the viscoelastic indicator material and the pressure sensitive adhesive.

26. The striped tape of claim 24 wherein the backing material includes on its surface a central stripe of the viscoelastic indicator material, one edge stripe of the pressure sensitive adhesive on each side of the central stripe, and one edge stripe of the pressure sensitive adhesive on at least one end of the central stripe.

27. The striped tape of claim 24 wherein the pressure sensitive adhesive is selected from the group consisting of acrylic pressure sensitive adhesives, silicone pressure sensitive adhesives, rubber resin blend pressure sensitive adhesives, triblock copolymer pressure sensitive adhesives, and vinyl ether polymer pressure sensitive adhesives.

28. The striped tape of claim 23 wherein the barrier material is selected from the group consisting of glassy polymers, semi-crystalline polymers, physically crosslinked elastomers, chemically crosslinked elastomers, segmented polyesters, radiation crosslinked polybutadiene, and pressure sensitive adhesives.

29. The striped tape of claim 23 wherein the barrier material comprises polystyrene.

30. The striped tape of claim 23 wherein the barrier material comprises thermoplastic rubber.

* * * * *